US005239681A

United States Patent [19]

Parnall et al.

[11] Patent Number: 5,239,681

[45] Date of Patent: Aug. 24, 1993

[54] RDS RADIO SYSTEM

[75] Inventors: Simon J. Parnall, London; Jonathan D. Newland, Croydon, both of United Kingdom; Theo Kamalski, Maarheeze, Netherlands; Sten Bergman, Stockholm, Sweden; Josef Berger, Baden, Austria

[73] Assignee: British Broadcasting Corporation, London, England

[21] Appl. No.: 688,628

[22] PCT Filed: Dec. 15, 1989

[86] PCT No.: PCT/GB89/01544

§ 371 Date: Aug. 8, 1991

§ 102(e) Date: Aug. 8, 1991

[87] PCT Pub. No.: WO90/07237

PCT Pub. Date: Jun. 28, 1990

[30] Foreign Application Priority Data

Dec. 15, 1988 [GB] United Kingdom ................ 8829274

[51] Int. Cl.[5] ........................ H04B 7/100; H04O 3/02

[52] U.S. Cl. ................................ 455/38.1; 455/186.1; 455/345; 340/993

[58] Field of Search ..................... 455/38.1, 45, 152.1, 455/345, 228, 186; 381/4, 6; 340/993

[56] References Cited

U.S. PATENT DOCUMENTS 4,907,159 3/1990 Mauge et al. ...................... 340/993

*Primary Examiner*—Reinhard J. Eisenzopf
*Assistant Examiner*—Almaz Woldu
*Attorney, Agent, or Firm*—Robert F. O'Connell; Dike, Bronstein, Roberts & Cushman

[57] ABSTRACT

A radio data system transmits message groups comprising four blocks of which the first block always carries the program identification code for the transmitting network (P1(TN)). One type of message group, identified by a corresponding group type code (GT) in a second block always carries a program identification code for another network (PI(ON) in a fourth block and carries various corresponding items of information in a third block. Which of these various items is in the third block is identified by a user code (UC) in the second block. The items of information in the third block may in particular include alternative frequency codes for the other network identified in the fourth block.

9 Claims, 3 Drawing Sheets

RDS RADIO SYSTEM

The Radio Data System RDS was developed under the auspices of the European Broadcasting Union (EBU) who publish its specification, "Specifications of the radio data system RDS for VHF/FM sound broadcasting" EBU Document 3244-E, 1984. The main objective of this system is to facilitate the realisation of automatic tuning features in new receivers by using the Programme (i.e., program) Identification (PI) code, Alternative Frequency (AF) codes, and, where appropriate, Other Network (ON) features of RDS. The various codes are carried by a digital data channel accompanying the broadcast program.

The data is broadcast in what are known as "groups". A group is a 104-bit message comprising four 26-bit blocks called block 1 to block 4. Within a block 16 bits carry information and 10 bits are used for error protection. Various different types of group have been proposed and the EBU specification give details of types 0 to 6, all with A and B variants. Every group always carries PI(TN) i.e. the PI code of the transmitting network in block 1. Block 2 contains various bits and groups of bits including the group type code, and TP(TN), i.e. the traffic program flag for the transmitting network bits which signifies whether the group is A type or B type.

The usage of blocks 3 and 4 is determined by the group type, indicated by the group type code in block 2. In type 0A groups, for example, block 3 carries two alternative frequency codes AF identifying channels which carry the same program, to facilitate rapid switching of channels, especially in car radios, in order to stay tuned to the selected program. Block 4 carries a program programme service name PS, two bytes at a time, for display on a suitably equipped receiver. In type 0B groups block 4 is as in type 0A except that block 3 repeats the PI code of block 1—when there is no AF information to transmit. Type B groups in general have block 4 as the corresponding type A group but have PI in block 3 instead of whatever is carried by block 3 in the type A group. A type B group can be used when the A-type is not required to increase the mean rate at which PI(TN) is transmitted.

One of the more sophisticated uses of RDS is to transmit information regarding other networks (ON) as well as the transmitting network (TN) to enable receivers to maintain updated information on other networks. One requirement is then to transmit alternative frequencies for the other networks, i.e. AF(ON). The EBU specification proposes to provide this facility in the type 3A group which is shown in the accompanying FIG. 1 which is derived directly from FIG. 10 of the EBU specification.

The following symbols are used in FIG. 1:

| | |
|---|---|
| PI(TN) | PI code for the transmitting network |
| CW | Checkword for a block |
| GT | Group type code, 4 bits |
| B | A or B type bit |
| TP | Traffic program flag |
| PTY | Program type code, 5 bits |
| AC | Address code, 3 bits |
| UC | Usage code, 2 bits |
| AF(ON) | Alternative frequency code for other network |
| PI(ON) | PI code for other network |
| PIN(ON) | Program item number for ther network |
| TA | Traffic announcement flag |

The usage code UC specifies the contents of block 4, as indicated in block 4. It will be seen that UC=00 means that block 4 carries a PI(ON) code while UC=11 means that block 4 carries two AF(ON) codes. Block 3 also carries AF(ON) codes. Since PI(ON) is not always present there has to be some way of associating the AF(ON) codes with the correct PI(ON) code. This is effected by means of the address code AC is block 2. The AF(ON) information in any group pertains to the PI(ON) information in a group with the same address code.

This proposal suffers from a number of disadvantages. Firstly the address code is only 3 bits which limits the transmission of other networks information to 8 networks. This is completely inadequate in developed societies with many different radio networks. Furthermore the PI(ON) data may not be reliably available at the time the fourth block is received, in which case the receiver does not know which network this block relates to and cannot use the information. The mean rate at which other networks information can be transmitted and reliably received is found to be severely limited on this account.

The object of the present invention is to overcome these problems and allow other networks information to be transmitted reliably and in relation to larger numbers of networks. The invention makes it possible to transmit such information for say 25 networks at approximately the same rate as it was possible for only 8 networks according to the prior art. Moreover there is no arbitrary limit at all as to the number of other networks which can be handled.

The invention is defined with particularity in the appended claims but involves the following distinguishing features:

Block 4 always carries PI(ON).

The usage code in block 2 (which may be longer than 2-bits) now relates to block 3.

Any other networks information in block 3 always relates to the other network identified by PI(ON) in block 4.

In consequence of the above, no address code AC is needed in block 2.

The invention is particularly suited to transmitting AF(ON) information in a manner proposed in Supplement 1 to the EBU specification, published March 1987 by the EBU Brussels as Supplement 1 to Tech. 3244-E, specification of the radio data system RDS for VHF/FM sound broadcasting; Protocols for the transmission of Alternative Frequencies. This document describes "Method B" according to which alternative frequencies are listed in matching pairs, each consisting of a tuning frequency and a valid alternative frequency therefor. These may be referred to as mapped frequency pairs. Nevertheless the invention can also be used with "Method B" whereby alternative frequencies are listed above.

The invention will be described in more detail, by way of example, with reference to the accompanying drawings, in which.

Figure 1:
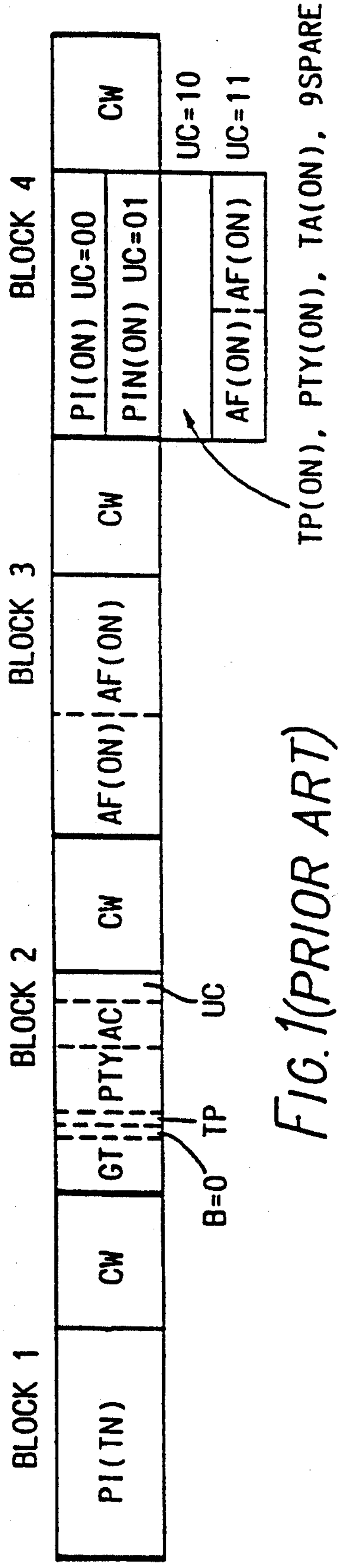
FIG. 1 (PRIOR ART)
FIG. 1 shows a known RDS group, already described above.
Figure 2A:
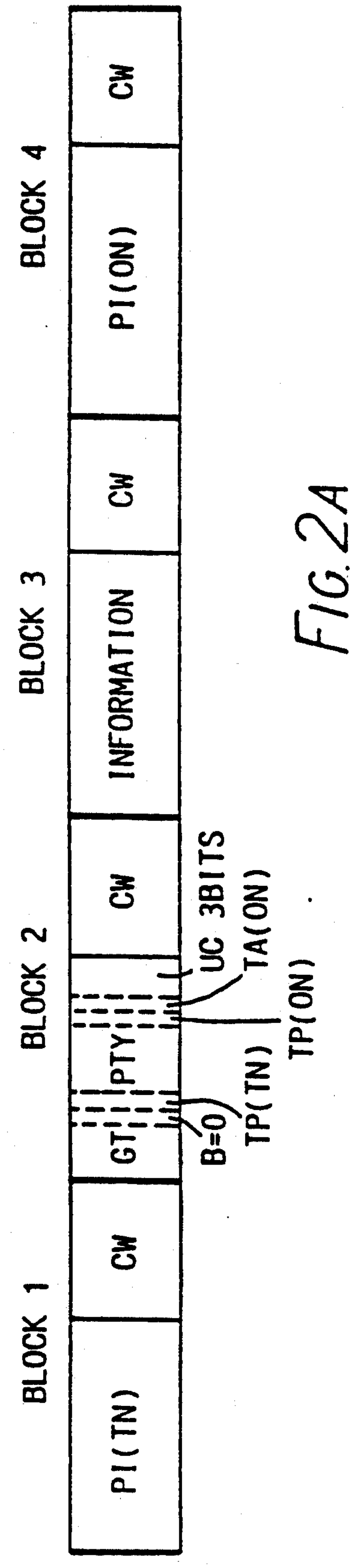
FIG. 2A shows a first type A RDS group according to the invention.
Figure 2B:
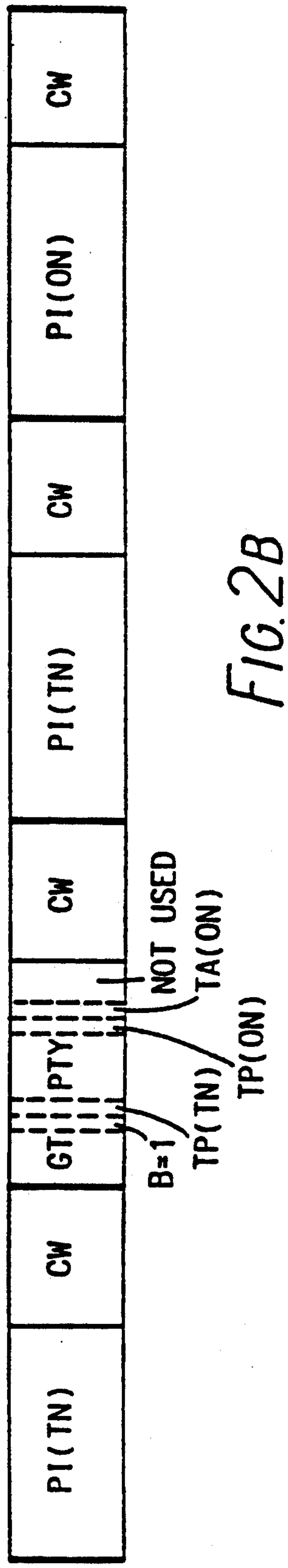
FIG. 2B shows the corresponding B group.

In FIG. 2A, block 2, GT, B, TP(TN) and PTY are as in the known group of FIG. 1. However TP(ON) and TA(ON) have been transferred to block 2, AC has disappeared and UC is now 3 bits. UC identifies 8 different contents for block 3, as explained below. Block 4 carries PI(ON). For completeness the corresponding B form is shown in FIG. 2B with block 3 carrying PI(TN), as in all B-form groups. Accordingly the UC bits in block 2 are unused.

FIG. 2A does not show the contents of block 3. They are as follows for the 8 different usage codes UC=000 to UC=111 binary.

| UC | CONTENTS |
|---|---|
| 000 | PS(ON) bytes 1 and 2 |
| 001 | PS(ON) bytes 3 and 4 |
| 010 | PS(ON) bytes 5 and 6 |
| 011 | PS(ON) bytes 7 and 8 |
| 100 | Two AF(ON), method A |
| 101 | AF(ON) mapped pair |
| 110 | PTY(ON) + 11 spare bits |
| 111 | PIN(ON). |

Thus four groups may be used to transmit a complete PS (program service) name for the other network identified in block 4, with usage codes 000 to 011. With usage codes 100 and 101 it is possible to transmit alternative frequencies, by method A and method B respectively, for the other network identified in block 4. Usage codes 110 and 111 enable program type and program identification number codes for the other network identified in block 4. With usage code 110 there are 11 spare bits available for the broadcasters use.

Figure 3:
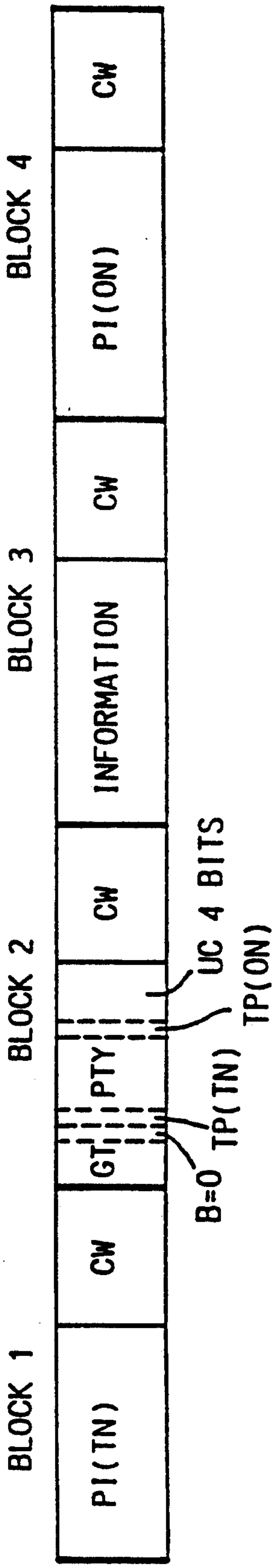
FIG. 3 shows a second type A RDS group according to the invention.

FIG. 3 shows a modified group, which it is proposed shall be group 8A with GT=1000. The difference from FIG. 2A is that TA(ON) has been dropped from block 2 to allow the usage code to be expanded to 4 bits, allowing 16 different meanings for the information block 3. It is proposed that codes UC=0000 to 0101 shall be used in the same way as codes UC=000 to 101 respectively, tabulated above. Codes UC=0110 to 1100 are spare for future applications. UC=1101 and UC=1110 correspond to UC=101 and UC=110 as tabulated above and UC=1111 is reserved for the broadcaster's use. The corresponding B-form group is not shown but is essentially as in FIG. 2B though with TA(ON) omitted from block 2 and four unused UC bits.

It will be appreciated that the invention can readily be implemented using known RDS transmitter and receiver designs. The transmitter is equipped to transmit the message groups on a sub-carrier, as specified in the EBU specification, and the controlling software is arranged to set up the messages formatted as in FIG. 2A or FIG. 3, or the corresponding B-forms. In general a transmitter will be adapted to select any one of the different types of message group identified by the four GTbits plus the B bit—up to eight different basic group types, each with an A-form and a B-form.

Figure 4:
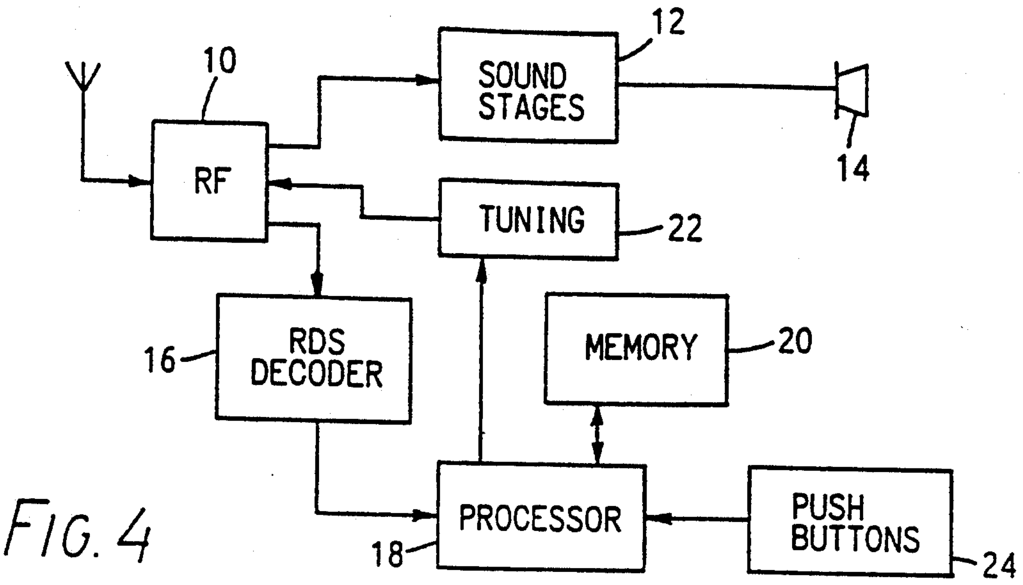
FIG. 4 is a block diagram of an RDS receiver.

FIG. 4 shows the essential features of an RDS receiver. The aerial feeds the RF stage 10 which feeds the conventional sound receiver stages 12 with output to the loudspeaker 14 and also feeds an RDS decoder 16. This decoder detects the RDS sub-carrier, recovers the RDS message groups and feeds the digital data to a processor 18. The processor 18 firstly decodes the GT and B bits in order to be aware of what action must be taken in respect of the group. The processor then interprets the other bits of group 2 and groups 3 and 4 in accordance with the group identification. In particular it writes AF(TN) and AF(ON) information into a memory 20 which stores this and the other recovered data to enable the receiver to adapt automatically by control of tuning circuits 22. Such adaptation will involve changing to an alternative frequency when the current signal becomes weak and responding to the user inputs from pushbuttons 24.

Figure 5:
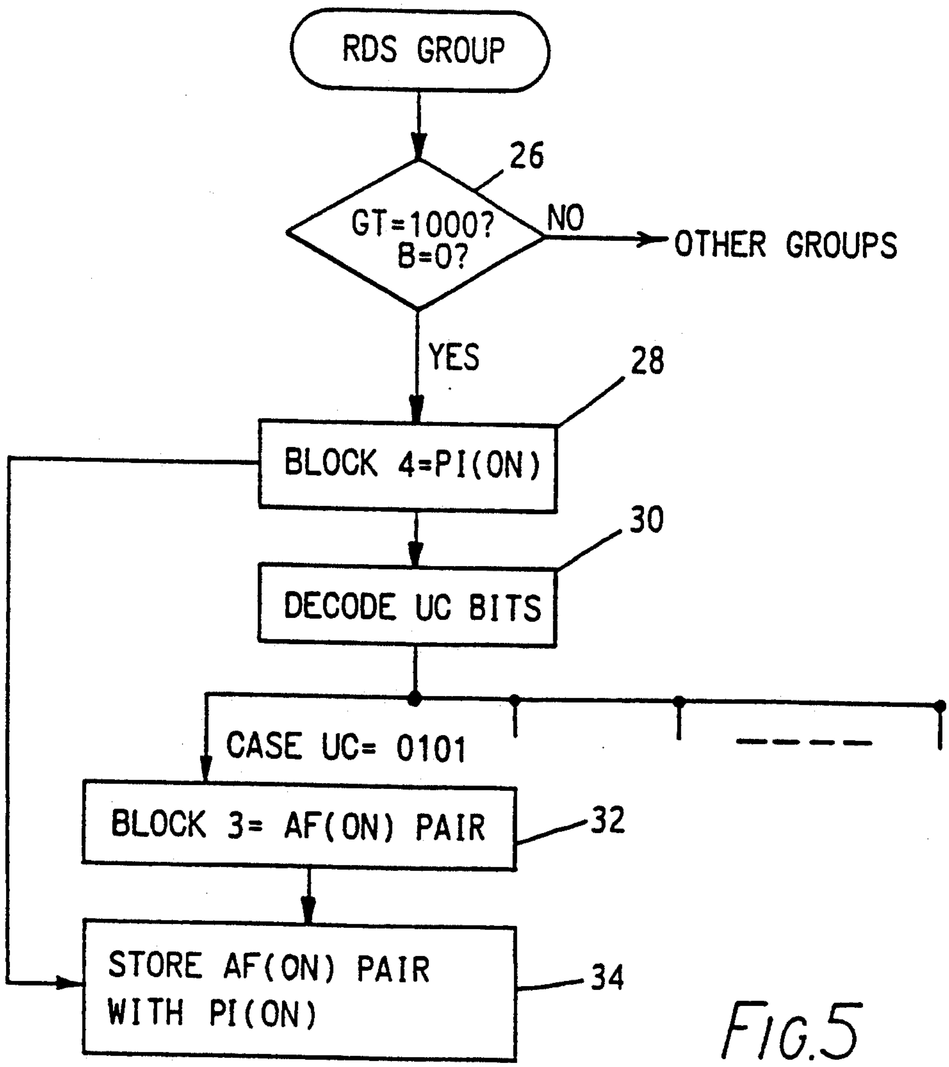
FIG. 5 is a flow-chart for part of the operation of the receiver.

FIG. 5 is a partial flow-chart showing the software required to handle group 8A (FIG. 3). The received group is tested (26) to ascertain if it is group 8A. If so, block 4 is accepted as a PI(ON) code (28) and the UC bits are decoded (30). FIG. 5 shows specifically the case when UC=0101. Block 3 is accepted as a mapped alternative frequency code pair (32) and then this code pair is stored (34) in the memory 20 in association with the PI(ON) code.

Although in the EBU specification the blocks 1 to 4 of a group are arranged in that order this is not an essential requirement although any system must obviously adhere to its own convention. The terms first to fourth block are therefore used in the following claims to distinguish the blocks without necessarily indicating the order in which they are arranged.

We claim:

1. A radio data system wherein data accompanying a program is transmitted in groups of at least four blocks, the groups being of various types and all comprising in a first block the program identification code (PI(TN)) for the transmitted program and in a second block both a code (GT) identifying the group type and a usage code (UC) identifying which of a selection of items of information are carried in one of the third and fourth blocks, which blocks include program identification codes of other networks (PI(ON)) and alternative frequency codes for other networks (AF(ON)), characterized in that items of information pertaining to another network, including alternative frequency codes for the said other network (AF(ON)), are all carried in the third block, the usage of which is identified by the usage code (UC), in the second block, whereas the program identification code for the said other network (PI(ON)) is always present in the fourth block.

2. A system according to claim 1, wherein one item of information pertaining to another network is at least one alternative frequency code (AF(ON)) associated by itself with the program identification code (PI(ON)).

3. A system according to claim 1, wherein one item of information pertaining to another network is a mapped pair of alternative frequency codes (AF(ON)), namely a code for a tuning frequency and a valid alternative frequency therefor.

4. A system according to claim 1, wherein the usage code (UC) in the second block consists of three bits identifying eight different contents for the third block.

5. A system according to claim 1, wherein the usage code (UC) in the second block consists of four bits identifying sixteen different contents for the third block.

6. A system according to claim 1, wherein the second block includes the traffic program flag bit (TP(ON)) pertaining to the other network identified by the code (PI(ON)) in the fourth block.

7. A system according to claim 6, wherein the second block also includes the traffic announcement flag bit (TA(ON)) pertaining to the other network identified by the code (PI(ON)) in the fourth block.

8. A radio data system receiver for use in a system in which data accompanying a program is transmitted in groups of at least four blocks, the groups being of various types and all comprising in a first block the program identification code (PI(TN)) for the transmitted program and in a second block both a code (GT) identifying the group type and a usage code (UC) identifying which of a selection of items of information are carried in one of the third and fourth blocks, which blocks include program identification codes of other networks (PI(ON)) and alternative frequency codes for other networks (AF(ON)), the receiver comprising means (16) for decoding received message groups, and processing means (18) for determining the group type from a group type code (GT) in the second block of the group and for processing the data in the remainder of the second block and the third and fourth blocks accordingly, characterized in that the processing means (18) includes means programmed to identify a group type in which: the fourth block always carries a program identification code for another network (PI(ON)), the third block carries various items of information pertaining to the said other network, and the second block includes a usage code (UC) which determines which of the said various items of information is carried by the third block.

9. A receiver according to claim 8, wherein the processing means (18) is responsive to one or more usage codes (UC) in the second block to treat the information in the third block as alternative frequency information for another network (AF(ON)) and to store such information in a memory (20) in association with the program identification code for the said other network (PI(ON)).

* * * * *